US010819492B2

United States Patent
Dai et al.

(10) Patent No.: US 10,819,492 B2
(45) Date of Patent: Oct. 27, 2020

(54) INFORMATION FEEDBACK METHOD, TRANSMISSION METHOD, FEEDBACK DEVICE AND TRANSMISSION DEVICE

(71) Applicant: ZTE CORPORATION, Shenzhen, Guangdong Province (CN)

(72) Inventors: Bo Dai, Shenzhen (CN); YuNgok Li, Shenzhen (CN); Zhaohua Lu, Shenzhen (CN); Wei Gou, Shenzhen (CN); Yajun Zhao, Shenzhen (CN)

(73) Assignee: ZTE CORPORATION (CN)

( * ) Notice: Subject to any disclaimer, the term of this patent is extended or adjusted under 35 U.S.C. 154(b) by 371 days.

(21) Appl. No.: 15/316,740

(22) PCT Filed: Sep. 26, 2014

(86) PCT No.: PCT/CN2014/087576

§ 371 (c)(1),
(2) Date: Dec. 6, 2016

(87) PCT Pub. No.: WO2015/184707

PCT Pub. Date: Dec. 10, 2015

(65) Prior Publication Data

US 2017/0155491 A1 Jun. 1, 2017

(30) Foreign Application Priority Data

Jun. 6, 2014 (CN) .......................... 2014 1 0251231

(51) Int. Cl.
*H04L 5/00* (2006.01)
*H04L 1/16* (2006.01)
(Continued)

(52) U.S. Cl.
CPC ......... *H04L 5/0057* (2013.01); *H04B 17/309* (2015.01); *H04L 1/16* (2013.01);
(Continued)

(58) Field of Classification Search
CPC .. H04B 17/309; H04B 17/318; H04B 17/327; H04L 1/0027; H04L 1/16; H04L 5/0048;
(Continued)

(56) References Cited

U.S. PATENT DOCUMENTS

2013/0322278 A1 12/2013 Lee et al.
2014/0301231 A1* 10/2014 Hooli .................... H04L 1/0027 370/252
2015/0162966 A1* 6/2015 Kim ..................... H04B 7/0456 370/252

FOREIGN PATENT DOCUMENTS

CN 102291224 A 12/2011
CN 103391124 A 11/2013
(Continued)

OTHER PUBLICATIONS

International Search Report and Written Opinion dated Mar. 6, 2015 for PCT Application No. PCT/CN2012/079272.
(Continued)

*Primary Examiner* — Khoa Huynh
(74) *Attorney, Agent, or Firm* — McDonald Hopkins LLC

(57) ABSTRACT

The present document discloses a method for feeding back information, a method for transmitting information, an apparatus for feeding back information, and an apparatus for transmitting information, herein the method for feeding back information includes a second transmission node acquiring configuration information transmitted by a first transmission node; the second transmission node acquiring channel state information in a time window according to the configuration information; and the second transmission node feeding back the channel state information in a unit of subframe set.

22 Claims, 3 Drawing Sheets

The transmission node 2 acquires configuration information transmitted by the first transmission node 1 — 101

↓

The transmission node 2 acquires channel state information in a time window according to the configuration information — 102

↓

The transmission node 2 feeds back the channel state information in a unit of subframe set — 103

(51) Int. Cl.

| | |
|---|---|
| ***H04B 17/309*** | (2015.01) |
| ***H04W 24/10*** | (2009.01) |
| ***H04W 72/04*** | (2009.01) |

(52) U.S. Cl.
CPC ............ *H04L 5/006* (2013.01); *H04L 5/0048* (2013.01); *H04L 5/0073* (2013.01); *H04W 24/10* (2013.01); *H04W 72/0446* (2013.01)

(58) Field of Classification Search
CPC ... H04L 5/0053; H04L 5/0055; H04L 5/0057; H04L 5/006; H04L 5/0062; H04L 5/0073; H04L 5/0085; H04W 24/10; H04W 72/0446
See application file for complete search history.

(56) References Cited

FOREIGN PATENT DOCUMENTS

| | | | |
|---|---|---|---|
| CN | 103427938 | A | 12/2013 |
| CN | 103748820 | A | 4/2014 |
| WO | 2012/045770 | A1 | 4/2012 |
| WO | 2013060763 | A1 | 5/2013 |

OTHER PUBLICATIONS

Extended European Search Report dated Apr. 13, 2017 for European Patent Application No. 14893782.4.
Qualcomm Incorporated: "Measurements and feedback extensions for improved operations in HetNets", 3GPP draft; R1-102353 Measurements and Feedback Extensions for Improved Operation in HetNets, 3, Mobile Competence Centre; 650, Route Des Lucioles; F-06921 Sophia-Antipolis Cedex; France, vol. RAN WG, No. Beijing, China; Apr. 12-16, 2010.
Office Action dated Feb. 25, 2020 for Chinese Patent Application No. 201410251231.X and English Translation.
Office Action dated Dec. 13, 2019 in EP Patent Application No. 14 893 782.4-1219.

* cited by examiner

INFORMATION FEEDBACK METHOD, TRANSMISSION METHOD, FEEDBACK DEVICE AND TRANSMISSION DEVICE

CROSS-REFERENCE TO RELATED APPLICATION(S)

This application is the U.S. National Phase application of PCT application number PCT/CN2014/087576 having a PCT filing date of Sep. 26, 2014, which claims priority of Chinese patent application 201410251231.X filed on Jun. 6, 2014, the disclosures of which are hereby incorporated by reference.

TECHNICAL FIELD

The present document relates to mobile communication technologies, and more particularly, to a method for feeding back information, a method for transmitting information, an apparatus for feeding back information and an apparatus for transmitting information.

BACKGROUND OF RELATED ART

The inventor of the present application at least discovers the following technical problems in the existing technology in the process of realizing the technical solution according to the embodiments of the present application:

Mobile communication systems widely use cellular networking schemes, thus greatly improving the utilization of wireless resources. However, the improvement of resource utilization leads to mutual interference of wireless signals between adjacent cellular cells and within a cell, which limits the further improvement of the cell throughput. Therefore, it is very important to study the anti-interference technology in the cellular system.

Methods such as interference randomization, interference cancellation, interference coordination etc. are widely used in cellular systems, to solve the interference problem, herein time and frequency resource interference information interaction between base stations is mainly performed for interference coordination, and then coordinated scheduling is achieved according to interactive information, thereby avoiding the problem of strong interference with each other.

In the LTE system, an ABS-subframe set and a Non-ABS-subframe set are defined for time-domain interference coordination, and information of the ABS-subframe set and the Non-ABS-subframe set are interacted between base stations. The base station avoids scheduling a user equipment at a cell edge on an ABS-subframe to the greatest extent so as to ensure that it does not interfere with other cells on the ABS-subframe and schedules the user equipment at the cell edge on an ABS-subframe set of a neighboring cell to avoid interference from other cells. However, such manner has limitations on information interaction between base stations, i.e., a feasible precondition of the manner is that the base stations must interact with each other. Otherwise, it cannot acquire the scheduling information of the neighboring cell, and thus cannot know the interference condition of the neighboring cell to its own cell. This brings large limitations on the practical deployment, and also increases the cost of practical applications. Therefore, how to more efficiently implement interference coordination so as to solve the interference problem becomes an urgent problem to be solved.

SUMMARY

In view of the above, the embodiments of the present document are intended to provide a method for feeding back information, a method for transmitting information, an apparatus for feeding back information and an apparatus for transmitting information, which at least solves the problem of efficiently performing interference coordination to mitigate interference and can avoid limitations on information interaction between base stations, thereby improving the flexibility of practical network deployment and reducing the cost of applications.

The technical solutions according to the embodiments of the present document are realized as follows:

A method for feeding back information according to an embodiment of the present document includes:

a second transmission node acquiring configuration information transmitted by a first transmission node;

the second transmission node acquiring channel state information in a time window according to the configuration information; and the second transmission node feeding back the channel state information in a unit of subframe set.

Alternatively, the configuration information includes at least one of the following: trigger information for feedback of the channel state information, a feedback period and an offset of the channel state information, subframe set related information, feedback manner information, measured resource position information, and measured transmission node information.

Alternatively, the subframe set includes a predefined subframe set and/or a subframe set configured by the first transmission node.

Alternatively, the channel state information in a unit of subframe set fed back by the second transmission node includes at least one of the following: subframe set index, interference strength information, interference type information, interfered channel type information, Received Signal Strength Indication (RSSI), and Reference Signal Receiving Quality (RSRQ);

the interference type information includes information of intra-system or inter-system; and the interfered channel type information includes information of a control channel or a data channel.

Alternatively, the subframe set index includes at least one of the following:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

Alternatively, a transmission manner of the configuration information includes that: the configuration information is transmitted by being carried on physical layer signaling and/or the configuration information is transmitted by being carried on high layer signaling.

Alternatively, the interference strength information includes interference strength information alone or interference strength information identified by a Channel Quality Indicator (CQI).

Alternatively, the channel state information includes channel state information before acquiring the configuration information and/or channel state information within a specified time after acquiring the configuration information.

Alternatively, the feedback manner information includes at least one of the following: a feedback report type, a feedback mode, transmission timing-related information of the feedback information, and a transmission manner of the feedback information.

Alternatively, the measured resource position information includes a resource position of a control channel area and/or a resource position of a data channel area.

Alternatively, the subframe set related information includes at least one of the following: a number of subframe sets, a measured subframe set index, a subframe position corresponding to the measured subframe set, a size of the time window, and a position of the time window.

A method for transmitting information according to an embodiment of the present document includes:

a first transmission node transmitting configuration information; and the first transmission node receiving channel state information in a unit of subframe set fed back by a second transmission node according to the configuration information.

Alternatively, the configuration information includes at least one of the following: trigger information for feedback of the channel state information, a feedback period and an offset of the channel state information, subframe set related information, feedback manner information, measured resource position information, and measured transmission node information.

Alternatively, the subframe set includes a predefined subframe set and/or a subframe set configured by the first transmission node.

Alternatively, the channel state information in a unit of subframe set fed back by the second transmission node includes at least one of the following: subframe set index, interference strength information, interference type information, interfered channel type information, Received Signal Strength Indication (RSSI), and Reference Signal Receiving Quality (RSRQ);

the interference type information includes information of intra-system or inter-system; and the interfered channel type information includes information of a control channel or a data channel.

Alternatively, the subframe set indexes include at least one of the following:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

Alternatively, a transmission manner of the configuration information includes that: the configuration information is transmitted by being carried on physical layer signaling and/or the configuration information is transmitted by being carried on high layer signaling.

Alternatively, the interference strength information includes interference strength information alone or interference strength information identified by a Channel Quality Indicator (CQI).

Alternatively, the channel state information includes channel state information before acquiring the configuration information and/or channel state information within a specified time after acquiring the configuration information.

Alternatively, the feedback manner information includes at least one of the following: a feedback report type, a feedback mode, transmission timing-related information of the feedback information, and a transmission manner of the feedback information.

Alternatively, the measured resource position information includes a resource position of a control channel area and/or a resource position of a data channel area.

Alternatively, in addition to transmitting the configuration information, the first transmission node further:

transmits data to the second transmission node in a same subframe set over a period of time; or receives data transmitted by the second transmission node in a same subframe set over a period of time.

Alternatively, the subframe set related information includes at least one of the following: a number of subframe sets, a measured subframe set index, a subframe position corresponding to the measured subframe set, a size of the time window, and a position of the time window.

An apparatus for feeding back information according to an embodiment of the present document includes:

a first acquisition unit arranged to acquire configuration information transmitted by a first transmission node;

a second acquisition unit arranged to acquire channel state information in a time window according to the configuration information; and a feedback unit arranged to feed back the channel state information in a unit of subframe set.

Alternatively, the configuration information includes at least one of the following: trigger information for feedback of the channel state information, a feedback period and an offset of the channel state information, subframe set related information, feedback manner information, measured resource position information, and measured transmission node information.

Alternatively, the subframe set includes a predefined subframe set and/or a subframe set configured by the first transmission node.

Alternatively, the channel state information in a unit of subframe set fed back by the second transmission node includes at least one of the following: subframe set index, interference strength information, interference type information, interfered channel type information, Received Signal Strength Indication (RSSI), and Reference Signal Receiving Quality (RSRQ);

the interference type information includes information of intra-system or inter-system; and the interfered channel type information includes information of a control channel or a data channel.

Alternatively, the subframe set index includes at least one of the following:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

Alternatively, a transmission manner of the configuration information includes that the configuration information is transmitted by being carried on physical layer signaling and/or the configuration information is transmitted by being carried on high layer signaling.

Alternatively, the interference strength information includes interference strength information alone, or interference strength information identified by a Channel Quality Indicator (CQI).

Alternatively, the channel state information includes channel state information before acquiring the configuration information and/or channel state information within a specified time after acquiring the configuration information.

Alternatively, the feedback manner information includes at least one of the following: a feedback report type, a feedback mode, transmission timing-related information of the feedback information, and a transmission manner of the feedback information.

Alternatively, the measured resource position information includes a resource position of a control channel area and/or a resource position of a data channel area.

Alternatively, the subframe set related information includes at least one of the following: a number of subframe sets, a measured subframe set index, a subframe position corresponding to the measured subframe set, a size of the time window, and a position of the time window.

When the first acquisition unit, the second acquisition unit and the feedback unit perform processes, the processes can be implemented by using a Central Processing Unit (CPU), a Digital Signal Processor (DSP), or a Field Programmable Gate Array (FPGA).

An apparatus for transmitting information according to an embodiment of the present document includes:

a transmission unit arranged to transmit configuration information to a second transmission node; and a reception unit arranged to receive channel state information in a unit of subframe set fed back by the second transmission node according to the configuration information.

Alternatively, the configuration information includes at least one of the following: trigger information for feedback of a channel state, a feedback period and an offset of the channel state, subframe set related information, feedback manner information, measured resource position information, and measured transmission node information.

Alternatively, the subframe set includes a predefined subframe set and/or a subframe set configured by the first transmission node.

Alternatively, the channel state information in a unit of subframe set fed back by the second transmission node includes at least one of the following: subframe set index, interference strength information, interference type information, interfered channel type information, Received Signal Strength Indication (RSSI), and Reference Signal Receiving Quality (RSRQ);

the interference type information includes information of intra-system or inter-system; and the interfered channel type information includes information of a control channel or a data channel.

Alternatively, the subframe set indexes include at least one of the following:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

Alternatively, a transmission manner of the configuration information includes that: the configuration information is transmitted by being carried on physical layer signaling and/or the configuration information is transmitted by being carried on high layer signaling.

Alternatively, the interference strength information includes interference strength information alone or interference strength information identified by a Channel Quality Indicator (CQI).

Alternatively, the channel state information includes channel state information before acquiring the configuration information and/or channel state information within a specific time after acquiring the configuration information.

Alternatively, the feedback manner information includes at least one of the following: a feedback report type, a feedback mode, transmission timing-related information of the feedback information, and a transmission manner of the feedback information.

Alternatively, the measured resource position information includes a resource position of a control channel area and/or a resource position of a data channel area.

Alternatively, the transmission unit is further arranged to transmit data to the second transmission node in a same subframe set over a period of time; and the reception unit is further arranged to receive data transmitted by the second transmission node in a same subframe set over a period of time.

Alternatively, the subframe set related information includes at least one of the following: a number of subframe sets, a measured subframe set index, a subframe position corresponding to the measured subframe set, a size of the time window, and a position of the time window.

When the transmission unit and the reception unit perform processes, the processes can be implemented by using a Central Processing Unit (CPU), a Digital Signal Processor (DSP), or a Field Programmable Gate Array (FPGA).

The method for feeding back information according to the embodiments of the present document includes: a second transmission node acquiring configuration information transmitted by a first transmission node; the second transmission node acquiring channel state information in a time window according to the configuration information; and the second transmission node feeding back the channel state information in a unit of subframe set. With an embodiment of the present document, the channel state information in the time window is acquired according to the configuration information, and the channel state information is fed back in a unit of subframe set, which achieves feedback of the channel state information from the view of the time domain instead of feedback of the channel state information from the frequency domain. This at least solves the problem of efficiently performing interference coordination to mitigate interference and can avoid limitations on information interaction between base stations, thereby improving the flexibility of practical network deployment and reducing the cost of applications.

SPECIFIED EMBODIMENTS

The implementation of the technical solutions will be further described in detail below with reference to accompanying drawings.

In the solutions of feeding back and transmitting information according to the embodiments of the present document, a user equipment can feed back channel state information in a time window based on subframe sets, herein the channel state information includes interference information, and the base station knows an interference condition experienced by the user equipment through the channel state information fed back by the user equipment, and then performs interference coordination according to the interference condition to avoid interference, thereby reducing limitations on information interaction between base stations, improving the flexibility of practical network deployment and reducing the cost of applications.

For convenience of description, the second transmission node herein is represented by transmission node 2, and the first transmission node herein is represented by transmission node 1.

Figure 1:
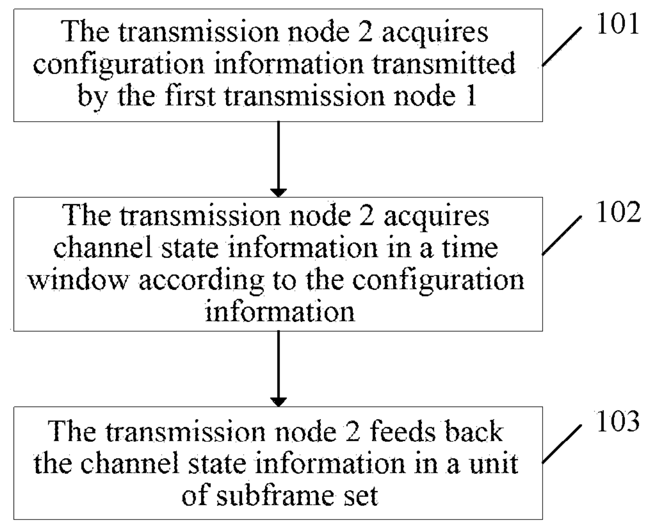
FIG. 1 is a flowchart of implementation of a feedback method according to an embodiment of the present document.

An embodiment of the present document provides a method for feeding back information. As shown in FIG. 1, the method includes the following steps.

In step 101, the transmission node 2 acquires configuration information transmitted by the first transmission node 1;

in step 102, the transmission node 2 acquires channel state information in a time window according to the configuration information; and in step 103, the transmission node 2 feeds back the channel state information in a unit of subframe set.

In an alternative implementation of embodiment one of the present document, the configuration information includes at least one of the following: trigger information for feedback of the channel state information, a feedback period and an offset of the channel state information, subframe set related information, feedback manner information, measured resource position information, and measured transmission node information.

The channel state information includes interference information, and the channel state information may also be simply referred to as interference information. In this case, the interference information may only include interference related information, or may not be limited to interference related information, but may further include channel quality and/or precoding information corresponding to a channel and/or rank indication information corresponding to a channel.

It should be pointed out here that the feedback method according to the embodiment of the present document is not limited to an execution order of steps 101-103 in FIG. 1. The embodiment of the present document can be implemented as long as these steps are included. The order can be arbitrarily disrupted, and the predicted effect of efficient interference coordination can also be achieved, to solve the problem of interference through efficient interference coordination, and to avoid limitations on information interaction between base stations, thereby improving the flexibility of practical network deployment and reducing the cost of applications.

In an alternative implementation of embodiment one of the present document, the subframe sets are defined to specifically include a predefined subframe set and/or a subframe set configured by the transmission node 1.

The number of subframe sets included in the time window is greater than or equal to 2, preferably greater than 2.

In an alternative implementation of embodiment one of the present document, the channel state information in a unit of subframe set fed back by the transmission node 2, as the channel state information in the time window, specifically includes at least one of the following: subframe set index, interference strength information, interference type information (intra-system or inter-system), interfered channel type information (control channel or data channel), Received Signal Strength Indication (RSSI), and Reference Signal Receiving Quality (RSRQ);

In an alternative implementation of embodiment one of the present document, the subframe set index is specifically selected to include at least one of the following:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

In an alternative implementation of embodiment one of the present document, a transmission manner of the configuration information includes that the configuration information is transmitted by being carried on physical layer signaling and/or the configuration information is transmitted by being carried on high layer signaling.

In an alternative implementation of embodiment one of the present document, the interference strength information includes interference strength information alone or interference strength information identified by a Channel Quality Indicator (CQI).

In an alternative implementation of embodiment one of the present document, the channel state information includes channel state information before acquiring the configuration information and/or channel state information within a specific time after acquiring the configuration information.

In an alternative implementation of embodiment one of the present document, the feedback manner information specifically includes at least one of the following: a feedback report type (for example, feedback for all the subframe sets, feedback for h1 subframe sets with minimum interference strength, feedback for h2 subframe sets with maximum interference strength, or round-robin feedback), a feedback mode (for example, channel state information before acquiring the configuration information or channel state information within a specific time after acquiring the configuration information), transmission timing-related information of the feedback information, and a transmission manner of the feedback information.

In an alternative implementation of embodiment one of the present document, the measured resource position information includes a resource position of a control channel area and/or a resource position of a data channel area.

In an alternative implementation of embodiment one of the present document, the subframe set related information includes at least one of the following: the number of subframe sets, a measured subframe set index, a subframe position corresponding to the measured subframe set, a size of the time window, and a position of the time window.

Figure 2:
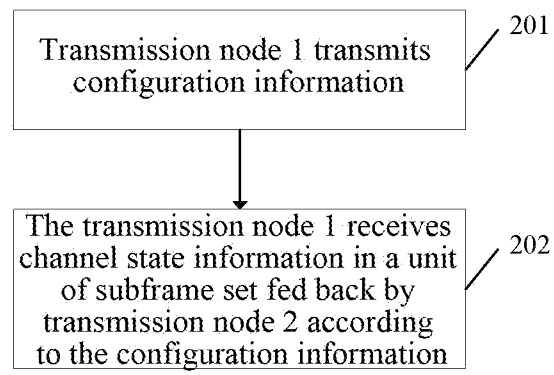
FIG. 2 is a flowchart of implementation of a transmission method according to an embodiment of the present document.

The embodiments of the present document provide a method for transmitting information. As shown in FIG. 2, the method includes the following steps.

In step 201, transmission node 1 transmits configuration information; and in step 202, the transmission node 1 receives channel state information in a unit of subframe set fed back by transmission node 2 according to the configuration information.

In an alternative implementation of embodiment one of the present document, the configuration information includes at least one of the following: trigger information for feedback of the channel state information, a feedback period and an offset of the channel state information, subframe set related information, feedback manner information, measured resource position information, and measured transmission node information.

The channel state information includes interference information, and the channel state information may also be simply referred to as interference information. In this case, the interference information may only include interference related information, or may not be limited to interference related information, but may further include channel quality and/or precoding information corresponding to a channel and/or rank indication information corresponding to a channel.

The number of subframe sets included in the time window is greater than or equal to 2, preferably greater than 2.

It should be pointed out here that the transmission method according to the embodiments of the present document is not limited to an execution order of steps 201-202 in FIG. 2. The embodiments of the present document can be implemented as long as these steps are included. The order can be arbitrarily disrupted, and the predicted effect of efficient interference coordination can also be achieved, to solve the problem of interference through efficient interference coordination, and to avoid limitations on information interaction between base stations, thereby improving the flexibility of practical network deployment and reducing the cost of applications.

In an alternative implementation of embodiment one of the present document, the subframe sets are defined to specifically include a predefined subframe set and/or a subframe set configured by the transmission node 1.

In an alternative implementation of embodiment one of the present document, the channel state information in a unit of subframe set fed back by the transmission node 2 specifically includes at least one of the following: subframe set index, interference strength information, interference type information (intra-system or inter-system), interfered channel type information (control channel or data channel), RSSI, and RSRQ.

In an alternative implementation of embodiment one of the present document, the subframe set index is specifically selected to include at least one of:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

In an alternative implementation of embodiment one of the present document, a transmission manner of the configuration information comprises that: the configuration information is transmitted by being carried on physical layer signaling and/or the configuration information is transmitted by being carried on high layer signaling.

In an alternative implementation of embodiment one of the present document, the interference strength information includes interference strength information alone or interference strength information identified by a Channel Quality Indicator (CQI).

In an alternative implementation of embodiment one of the present document, the channel state information includes channel state information before acquiring the configuration information and/or channel state information within a specific time after acquiring the configuration information.

In an alternative implementation of embodiment one of the present document, the feedback manner information includes at least one of the following: a feedback report type (for example, feedback for all the subframe sets, feedback for h1 subframe sets with minimum interference, feedback for h2 subframe sets with maximum interference, or round-robin feedback), a feedback mode (for example, channel state information before acquiring the configuration information or channel state information within a specific time after acquiring the configuration information), transmission timing-related information of the feedback information, and a transmission manner of the feedback information.

In an alternative implementation of embodiment one of the present document, the measured resource position information includes a resource position of a control channel area and/or a resource position of a data channel area.

In an alternative implementation of embodiment one of the present document, in addition to transmitting the configuration information, further, the transmission node 1 transmits data to the transmission node 2 in the same subframe set over a period of time; or the transmission node 1 receives data transmitted by the transmission node 2 in the same subframe set over a period of time.

In an alternative implementation of embodiment one of the present document, the subframe set related information includes at least one of the following: the number of subframe sets, a measured subframe set index, a subframe position corresponding to the measured subframe set, a size of the time window, and a position of the time window.

Figure 3:
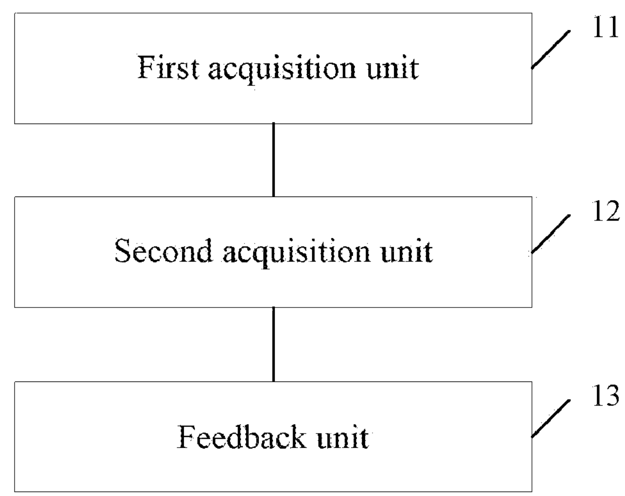
FIG. 3 is a constitutional structural diagram of a feedback apparatus according to an embodiment of the present document.

An embodiment of the present document provides an apparatus for feeding back information. As shown in FIG. 3, the apparatus includes:

a first acquisition unit 11 arranged to acquire configuration information transmitted by a first transmission node;

a second acquisition unit 12 arranged to acquire channel state information in a time window according to the configuration information; and a feedback unit 13 arranged to feed back the channel state information in a unit of subframe set.

In an alternative implementation of embodiment one of the present document, the configuration information includes at least one of the following: trigger information for feedback of the channel state information, a feedback period and an offset of the channel state information, subframe set related information, feedback manner information, measured resource position information, and measured transmission node information.

In an alternative implementation of embodiment one of the present document, the subframe set includes a predefined subframe set and/or a subframe set configured by the first transmission node.

In an alternative implementation of embodiment one of the present document, the channel state information in a unit of subframe set fed back by the second transmission node includes at least one of the following: subframe set index, interference strength information, interference type information, interfered channel type information, Received Signal Strength Indication (RSSI), and Reference Signal Receiving Quality (RSRQ);

the interference type information includes information of intra-system or inter-system; and the interfered channel type information includes information of a control channel or a data channel.

In an alternative implementation of embodiment one of the present document, the subframe set index includes at least one of the following:

feedback for h1 subframe sets with minimum interference in the time window;

feedback for h2 subframe sets with maximum interference in the time window;

feedback for all the subframe sets in the time window at the same time; and feedback for h3 subframe sets by h3 subframe sets sequentially in a round-robin manner;

herein h1, h2 and h3 are positive integers.

In an alternative implementation of embodiment one of the present document, a transmission manner of the configuration information includes that: the configuration information is transmitted by being carried on physical layer signaling and/or the configuration information is transmitted by being carried on high layer signaling.

In an alternative implementation of embodiment one of the present document, the interference strength information includes interference strength information alone or interference strength information identified by a Channel Quality Indicator (CQI).

In an alternative implementation of embodiment one of the present document, the channel state information includes channel state information before acquiring the configuration information and/or channel state information within a specified time after acquiring the configuration information.

In an alternative implementation of embodiment one of the present document, the feedback manner information includes at least one of the following: a feedback report type, a feedback mode, transmission timing-related information of the feedback information, and a transmission manner of the feedback information.

In an alternative implementation of embodiment one of the present document, the measured resource position information includes a resource position of a control channel area and/or a resource position of a data channel area.

In an alternative implementation of embodiment one of the present document, the subframe set related information includes at least one of the following: the number of subframe sets, a measured subframe set index, a subframe position corresponding to the measured subframe set, a size of the time window, and a position of the time window.

Figure 4:
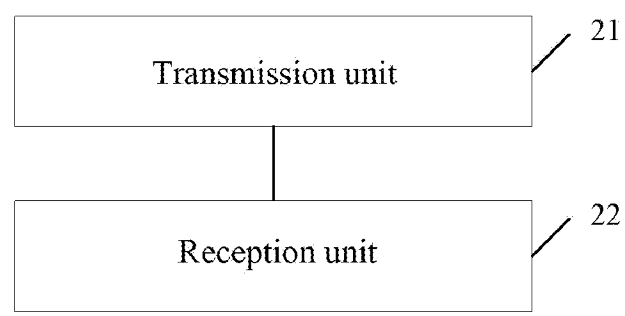
FIG. 4 is a constitutional structural diagram of a transmission apparatus according to an embodiment of the present document.

The embodiments of the present document provide an apparatus for transmitting information. As shown in FIG. 4, the apparatus includes:

a transmission unit 21 arranged to transmit configuration information to a second transmission node; and a reception unit 22 arranged to receive channel state information in a unit of subframe set fed back by the second transmission node according to the configuration information.

In an alternative implementation of embodiment one of the present document, the configuration information includes at least one of the following: trigger information for feedback of channel state information, a feedback period and an offset of the channel state information, subframe set related information, feedback manner information, measured resource position information, and measured transmission node information.

In an alternative implementation of embodiment one of the present document, the subframe set includes a predefined subframe set and/or a subframe set configured by the first transmission node.

In an alternative implementation of embodiment one of the present document, the channel state information in a unit of subframe set fed back by the second transmission node includes at least one of the following: subframe set index, interference strength information, interference type information, interfered channel type information, Received Signal Strength Indication (RSSI), and Reference Signal Receiving Quality (RSRQ);

the interference type information includes information of intra-system or inter-system; and the interfered channel type information includes information of a control channel or a data channel.

In an alternative implementation of embodiment one of the present document, the subframe set index includes at least one of the following:

feedback for h1 subframe sets with minimum interference in the time window;

feedback for h2 subframe sets with maximum interference in the time window;

feedback for all the subframe sets in the time window; and feedback for h3 subframe sets by h3 subframe sets sequentially in a round-robin manner;

herein h1, h2 and h3 are positive integers.

In an alternative implementation of embodiment one of the present document, a transmission manner of the configuration information includes that: the configuration information is transmitted by being carried on physical layer signaling and/or the configuration information is transmitted by being carried on high layer signaling.

In an alternative implementation of embodiment one of the present document, the interference strength information specifically includes interference strength information alone or interference strength information identified by a Channel Quality Indicator (CQI).

In an alternative implementation of embodiment one of the present document, the channel state information includes channel state information before acquiring the configuration information and/or channel state information within a specific time after acquiring the configuration information.

In an alternative implementation of embodiment one of the present document, the feedback manner information includes at least one of the following: a feedback report type, a feedback mode, transmission timing-related information of the feedback information, and a transmission manner of the feedback information.

In an alternative implementation of embodiment one of the present document, the measured resource position information includes a resource position of a control channel area and/or a resource position of a data channel area.

In an alternative implementation of embodiment one of the present document, the transmission unit is further arranged to transmit data to the second transmission node in the same subframe set over a period of time; and the reception unit is further arranged to receive data transmitted by the second transmission node in the same subframe set over a period of time.

In an alternative implementation of embodiment one of the present document, the subframe set related information includes at least one of the following: the number of subframe sets, a measured subframe set index, a subframe position corresponding to the measured subframe set, a size of the time window, and a position of the time window.

Other features and advantages of the embodiments of the present document will be set forth in the description that follows and, in part, will become obvious from the description, or may be learned by practice of the present document. The purpose and other advantages of the embodiments of the present document may be realized and acquired by the structure particularly pointed out in the description, the claims and the accompanying drawings.

In order to make the purpose, technical solutions and advantages of the embodiments of the present document to become more apparent and obvious, the preferred embodiments of the present document will be described in detail below with reference to the accompanying drawings. It is to be understood that the preferred embodiments described hereinafter are merely used to illustrate and explain the present document, and are not intended to limit the present document. The embodiments in the present application and the features in the embodiments can be combined with each other randomly without conflict.

In the existing technology, the base station realizes time domain interference coordination through interacting between ABS-subframes and Non-ABS-subframes. This manner is limited by interaction through air interfaces between base stations, and the interacted subframe set information is a cell-specific way. In practice, as data is transmitted in a user-specific unicast manner, interference is UE-specific, and interferences experienced by different UEs are different, there is a limitation that definition of the cell-specific subframe set is not flexible enough. In addition, definition of only two subframe sets is also not beneficial for interference coordination, for example, mutual interference between any two of three adjacent base stations. The two subframe sets cannot be used well for execution of interference coordination. Further, as there is no feedback of time domain interference information, the ABS-subframes and Non-ABS-subframes defined by the base station also cannot match the actual interference condition.

Therefore, an embodiment of the present document provides the above-described solutions for feeding back and transmitting information. With the feedback of time domain interference information by the transmission node 2 (user equipment), the transmission node 1 (base station) can autonomously perform coordination, and can perform time domain coordination in a UE-specific manner, and thereby interference experienced by the transmission node 2 is reduced, and it is no longer limited by information interaction between the base stations. This improves the performance of data transmission of the transmission node 2, reduces the deployment limitations, and lowers the cost of the implementation.

Figure 6:
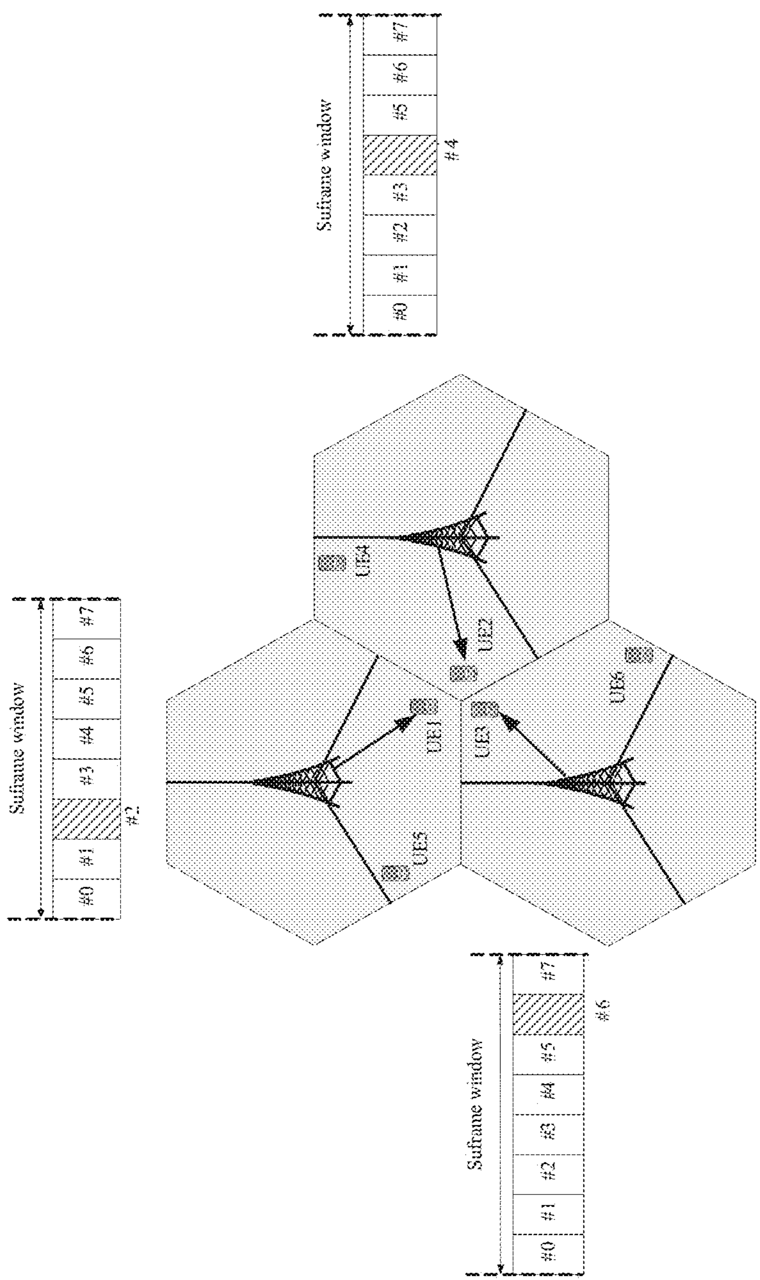
FIG. 6 is a diagram of interference coordination based on subframes according to an embodiment of the present document.

A specific application example is shown in FIG. 6. The Subframe window in FIG. 6 refers to a subframe time window. The base station 1, the base station 2 and the base station 3 in FIG. 6 are adjacent to each other, herein there are three UEs which are UE1, UE2, and UE3 respectively in a position where three cells are intersected. The three UEs interfere with each other. For the UE4, the UE5 and the UE6, although they are also located at cell edges, as they are not adjacent to each other, there is no interference among them, and there will be no interfere with the UE1, the UE2 and the UE3. Therefore, when only considering UE1 to UE6, the UE1, the UE2 and the UE3 need to schedule different subframe sets (the UE3 corresponds to subframe set 6, the UE2 corresponds to subframe set 4, and the UE1 corresponds to subframe set 2, as indicated by shaded hatches in FIG. 6); and the UE4, the UE5 and the UE6 can schedule any subframe set, and only by feeding back interference information among these UEs by the UEs, the base station can accurately know the interference information, and can achieve data transmission by configuring suitable scheduling of subframe sets.

The method for feeding back information according to the embodiments of the present document includes:

transmission node 2 acquiring configuration information transmitted by transmission node 1;

the transmission node 2 acquiring channel state information in a time window according to the configuration information; and the transmission node 2 feeding back the channel state information in a unit of subframe set.

Herein, the channel state information includes at least one of the following: interference information, channel quality information, RSSI, and RSRQ.

Herein, the configuration information includes at least one of the following: trigger information for feedback of the channel state information, a feedback period and an offset of the channel state information, subframe set related information, feedback manner information, measured resource position information, and measured transmission node information.

Herein, the transmission node 1 and the transmission node 2 respectively correspond to a base station and a user equipment, or communication through air interfaces between a base station and a base station, or communication between a base station and a relay node, or communication between a user equipment and a user equipment.

Figure 5:
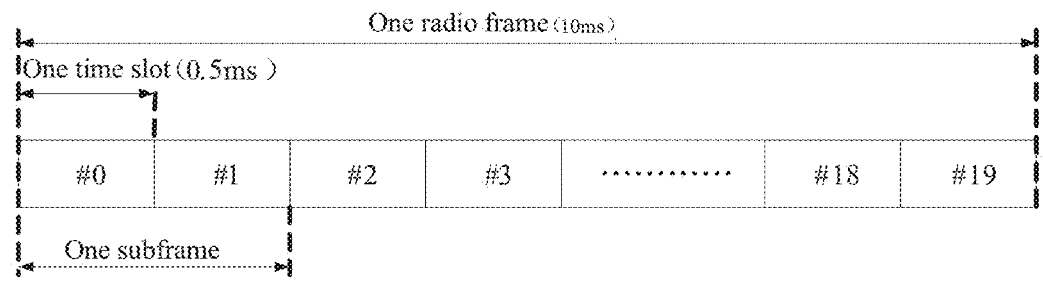
FIG. 5 is a diagram of an existing LTE frame structure.

Herein, when the method is applied to an LTE system, the subframe is defined as an LTE system subframe, as shown in FIG. 5, or may also be a subframe in a newly defined frame structure based on a new scenario, such as an unlicensed spectrum, or when being shared with other spectrum. The time domain feedback may also be applied to other systems, such as an IEEE 802 system. The subframe is only a time domain identification unit, and a specific definition thereof may be specifically selected for a system to which it is applied.

As for the trigger information, triggering may be performed for a single subframe set, or also for a plurality of subframe sets, or for all the subframe sets. In addition, the trigger information further includes triggering feedback of the channel information only one time, or triggering feedback of the channel information many times.

Alternatively, the subframe set is defined to specifically include a predefined subframe set and/or a subframe set configured by the transmission node 1.

The predefined subframe set includes: a pre-appointed manner, for example, dividing corresponding subframes according to HARQ processes, herein different HARQ processes correspond to different subframe sets, or grouping HARQ processes, and including subframes corresponding to the same group of HARQ processes in a subframe set, herein different groups of HARQ processes correspond to different subframe sets, or dividing the subframes at equal intervals according to the number of subframe sets. For example, if the number of subframe sets is 4, the subframes are divided consecutively at intervals starting from a first subframe of a first radio frame. That is, 0, 4, 8, . . . correspond to subframe set 1, 1, 5, 9, . . . correspond to subframe set 2, 2, 6, 10, . . . correspond to subframe set 3, and 3, 7, 11, . . . correspond to subframe set 4. The HARQ processes may be grouped consecutively or may be grouped at intervals. For example, 8 processes are divided into 4 groups, herein process 0 and process 1 are group 0, process 2 and process 3 are group 1, process 4 and process 5 are group 2, and process 6 and process 7 are group 3, or process 0 and process 4 are group 0, process 1 and process 5 are group 1, process 2 and process 6 are group 2, and process 3 and process 7 are group 3. The number of subframe sets may also be another value.

The transmission node 1 configuring the subframe sets includes the transmission node 1 indicating specific division of subframe sets through signaling, for example, indicating subframes corresponding to a subframe set through a bitmap etc.

The above process further includes firstly predefining division of subframe sets based on a predefined set configuration manner, and indicating measured subframe sets in the predefined subframe sets through configuration information.

Alternatively, the subframe set related information includes at least one of the following:

the number of subframe sets, a measured subframe set index, a subframe position corresponding to the measured subframe set, a size of the time window, and a position of the time window.

Alternatively, the channel state information in a unit of subframe set fed back by the transmission node 2 specifically includes at least one of the following: subframe set index, interference strength information, interference type information, interfered channel type information, RSSI, and RSRQ.

The interference type information includes: whether the current interference is interference in the same system. For example, when it is detected that signal power in the same system exceeds a threshold, it is considered that interference in the same system is detected; otherwise, it is considered that no interference in the same system is detected.

The interfered channel type information includes: whether the interfered channel type is a control channel or a data channel. For example, when interference experienced by a control channel exceeds a threshold in a subframe set, the interference experienced by the control channel is fed back, when interference experienced by a data channel exceeds a threshold in a subframe set, the interference experienced by the data channel is fed back, if both interferences experienced by a data channel and a control channel exceed a threshold, the interferences experienced by the two channels are fed back at the same time, or a larger one of the interferences experienced by the two channels is fed back. Further, the interferences experienced by the data channel and the control channel may also be fed back in a time-division manner, and whether the interference is the interference of the control channel or the interference of the data channel is identified through time domain positions, or identified through interfered channel type information.

Alternatively, the subframe set indexes are specifically selected to include at least one of the following:

feedback for h1 subframe sets with minimum interference in the time window;

feedback for h2 subframe sets with maximum interference in the time window;

feedback for all the subframe sets in the time window at the same time; and feedback for h3 subframe sets by h3 subframe sets sequentially in a round-robin manner;

herein h1, h2 and h3 are positive integers.

It specifically includes: sorting the various subframe sets in the time window from low to high according to the interference level experienced by each subframe set, selecting and feeding back first h1 subframe set indexes after the sorting, or selecting and feeding back last h2 subframe set indexes after the sorting, or feeding back the interference level corresponding to each of all the subframe sets in the time window; or sorting all the subframe sets according to the subframe set indexes, and firstly feeding back the interference level experienced by each of first h3 subframe sets after the sorting and then feeding back the interference level experienced by each of h3 subframe sets arranged after the subframe sets which are fed back the last time, if the last subframe set is reached, accumulating h3 subframe sets from the first subframe set for feedback, or if the last subframe set is reached, stopping the feedback at this time, and accumulating the subframe sets from the first subframe set for feedback the next time.

Alternatively, the channel state information in a unit of subframe set fed back by the transmission node 2 further includes: frequency domain information, which specifically includes at least one of the following: a component carrier index, a subband index, a CQI based on a component carrier, and a CQI based on a subband.

When the transmission node 2 feeds back the channel state information in a unit of subframe set, it also feeds back frequency domain channel state information, such as CQI information of the best subband, wideband CQI information, or wideband CQI information on the best component carrier, CQI information of the best subband on the best component carrier, wideband CQI information on the worst component carrier, and CQI information of the worst subband on the worst component carrier.

Alternatively, the method for transmitting configuration information specifically includes: the configuration information being physical layer signaling and/or the configuration information being high layer signaling.

The physical layer signaling may be carried on a physical downlink control channel, such as a PDCCH or an ePDCCH.

The configuration information may be carried on the physical layer signaling, for example, the configuration information is carried through a dedicated downlink control format for time domain interference feedback, or the configuration information is added to a dedicated downlink control format for carrying data scheduling information, such as a DCI Format 0, a DCI Format 1A, a DCI Format 2B/2C, or a new downlink control format etc.

The configuration information may be carried on the high layer signaling, such as user-specific RRC signaling, or MAC layer signaling.

The configuration information may be partially carried on physical signaling, or may be partially carried on high layer signaling. For example, the high layer signaling configures one or more of subframe set related information, feedback manner information, and measured resource position information, and the physical layer signaling configures trigger information and/or measured transmission node information, or the high layer signaling configures one or more of feedback manner information and measured resource position information, and the physical layer signaling configures one or more of trigger information, measured transmission node information, and subframe set related information, or multiple groups of measured sets are configured through the high layer signaling, and a measured set which currently triggered for feedback is selected through the physical layer signaling.

The transmission node 2 receives corresponding signaling according to the above configuration information transmission manner.

Alternatively, the interference strength information specifically includes interference strength information alone, or interference strength information identified by CQI.

The interference strength information alone includes interference power measured for a specific resource.

The interference strength information identified by the CQI includes interference strength information identified by the CQI using target signal power and interference power information. The CQI may be wideband CQI, or may also be CQI based on preferably h4 subbands, herein h4 is a positive integer.

Alternatively, the channel state information includes channel state information before acquiring the configuration information (which may include a subframe in which the configuration information is located, or may not include the subframe in which the configuration information is located) and/or channel state information within a specific time after acquiring the configuration information.

The channel state information includes interference information which specifically includes information of interference which has been experienced before acquiring the configuration information and/or information of interference which is experienced within a specific time after acquiring the configuration information.

The interference information may be defined in a predefined manner, for example, the interference information is defined as information of interference which has been experienced before acquiring the configuration information and/or information of interference which is experienced within a specific time after acquiring the configuration information.

It is also possible to use a manner of notification through signaling, for example, the interference information is determined according to time window related information in the subframe set related information. A position where the interference information is measured is determined from a position of the time window, and thereby the acquired interference information is fed back to a target transmission node.

The position of the time window may also be predefined, such as corresponding subframe sets in successive M subframes starting from the $k^{th}$ subframe after receiving the configuration information, herein M preferably is 8, 40, 80, etc., which depends on the definition of the subframe sets.

Alternatively, the feedback manner information specifically includes at least one of the following: a feedback report type (for example, feedback for all the subframe sets, feedback for h1 subframe sets with minimum interference strength, feedback for h2 subframe sets with maximum interference strength, or round-robin feedback), a feedback mode (for example, channel state information before acquiring the configuration information or channel state information within a specific time after acquiring the configuration information), transmission timing-related information of the feedback information, and a transmission manner of the feedback information.

The transmission timing related information of the feedback information specifically includes: the number of triggers for feedback and/or time domain position related information for feedback. For example, when a dynamic trigger manner is used for feedback, the feedback may be triggered once at a time, or the feedback may be triggered many times at a time. A time interval for each feedback may be predefined or may also be configured through signaling.

The manner for transmitting the feedback information specifically includes: a channel type for transmission of the feedback information and/or channel position information for the transmission of the feedback information. For example, the feedback may be performed using a physical uplink control channel, or may also be performed using a physical uplink shared channel. When the feedback is performed using a physical uplink control channel, information related to an index of the physical uplink control channel is indicated, and when the feedback is performed using a physical uplink shared channel, related information such as a frequency domain position, modulation and coding, power indication signaling etc. of the physical uplink shared channel is indicated. The manner for transmitting the feedback information may also include carrying the feedback information through high layer signaling, for example, a channel state of time domain subframe sets is fed back through RSSI or RSRQ.

Alternatively, the measured resource position information includes a resource position of a control channel area and/or a resource position of a data channel area.

The resource position may be configured using an existing CSI (CSI-RS, zero-power CSI-RS, or CSI-IM) resource position of an LTE system, or a CRS resource position. For example, interference is measured in positions of the virtual ports 1, 2 and 3 by muting data in the positions of virtual ports 1, 2 and 3, or the interference is directly measured according to the CRS, or interference is measured in a position of the virtual port 7 by muting the data in the position of the virtual port 7, or the interference is directly measured according to the DRS. Herein, the CSI-IM is an abbreviation of Channel-State Information-Interference Measurement.

Specifically, the transmission node 2 performs interference measurement on corresponding resources according to the configuration information, and feeds back interference information in a manner indicated by the configuration information.

The method for transmitting information according to the embodiments of the present document includes: transmission node 1 transmitting configuration information; the transmission node 1 receiving channel state information in a unit of subframe set fed back by transmission node 2 according to the configuration information.

Herein, the configuration information includes at least one of the following: trigger information for feedback of the channel state information, a feedback period and an offset of the channel state information, subframe set related information, feedback manner information, measured resource position information, and measured transmission node information.

The channel state information includes interference information, and the channel state information may also be simply referred to as interference information. In this case, the interference information may only include interference related information, or may not be limited to interference related information, but may further include channel quality and/or precoding information corresponding to a channel and/or rank indication information corresponding to a channel.

Specific representation of the interference information may be identified by dedicated interference information, or may also be implicitly identified by channel quality information or RSSI or RSRQ.

Herein, the transmission node 1 and the transmission node 2 respectively correspond to a base station and a user equipment, or communication through air interfaces between a base station and a base station, or communication between a base station and a relay node, or communication between a user equipment and a user equipment.

Herein, when the method is applied to an LTE system, the subframe is defined as an LTE system subframe, as shown in FIG. 5, or the subframe may also use a new definition based on a new scenario, such as an unlicensed spectrum, or when being shared with other spectrum. The time domain feedback may also be applied to other systems, such as IEEE. The subframe is only a time domain identification unit, and a specific definition thereof may be specifically selected for a system to which it is applied.

As for the trigger information, triggering may be performed for a single subframe set, or also for a plurality of subframe sets, or for all the subframe sets. In addition, the trigger information further includes triggering feedback of the channel information only one time, or triggering feedback of the channel information many times; and alternatively, the subframe sets are defined to specifically include a predefined subframe set and/or a subframe set configured by the transmission node 1.

The predefined subframe set includes: a pre-appointed manner, for example, dividing corresponding subframes according to HARQ processes, herein different HARQ processes correspond to different subframe sets, or grouping HARQ processes, and including subframes corresponding to the same group of HARQ processes in a subframe set, herein different groups of HARQ processes correspond to different subframe sets, or dividing the subframes at equal intervals according to the number of subframe sets. For example, if the number of subframe sets is 4, the subframes are divided consecutively at intervals starting from a first subframe of a first radio frame. That is, 0, 4, 8, . . . correspond to subframe set 1, 1, 5, 9, . . . correspond to subframe set 2, 2, 6, 10, . . . correspond to subframe set 3, and 3, 7, 11, . . . correspond to subframe set 4. The HARQ processes may be grouped consecutively or may be grouped at intervals. For example, 8 processes are divided into 4 groups, herein process 0 and process 1 are group 0, process 2 and process 3 are group 1, process 4 and process 5 are group 2, and process 6 and process 7 are group 3, or process 0 and process 4 are group 0, process 1 and process 5 are group 1, process 2 and process 6 are group 2, and process 3 and process 7 are group 3. The number of subframe sets may also be another value.

The transmission node 1 configuring the subframe sets includes the transmission node 1 indicating specific division of subframe sets through signaling, for example, indicating subframes corresponding to a subframe set through a bitmap etc.

The above process further includes firstly predefining division of subframe sets based on a predefined set configuration manner, and indicating measured subframe sets in the predefined subframe sets through configuration information.

The number of subframe sets included in the time window is greater than or equal to 2, and preferably, greater than 2; and alternatively, the channel state information in a unit of subframe set fed back by the transmission node 2 specifically includes at least one of the following: subframe set index, interference strength information, interference type information (intra system or inter system), interfered channel type information (control channel or data channel), RSSI, and RSRQ.

The interference type information includes whether the current interference is interference in the same system. For example, when it is detected that signal power in the same system exceeds a threshold, it is considered that interference in the same system is detected; otherwise, it is considered that no interference in the same system is detected.

The interfered channel type information includes whether the interfered channel type is a control channel or a data channel. For example, when interference experienced by a control channel exceeds a threshold in a subframe set, the interference experienced by the control channel is fed back, when interference experienced by a data channel exceeds a threshold in a subframe set, the interference experienced by the data channel is fed back, if both interferences experienced by a data channel and a control channel exceed a threshold, the interferences experienced by the two channels are fed back at the same time, or a larger one of the interferences experienced by the two channels is fed back. Further, the interferences experienced by the data channel and the control channel may also be fed back in a time-division manner, and whether the interference is the interference of the control channel or the interference of the data channel is identified through time domain positions, or identified through interfered channel type information.

Alternatively, the subframe set indexes are specifically selected to include at least one of the following:

feedback for h1 subframe sets with minimum interference in the time window;

feedback for h2 subframe sets with maximum interference in the time window;

feedback for all the subframe sets in the time window at the same time; and feedback for h3 subframe sets by h3 subframe sets sequentially in a round-robin manner;

herein h1, h2 and h3 are positive integers.

It specifically includes: sorting the various subframe sets in the time window from low to high according to the interference level experienced by each subframe set, selecting and feeding back first h1 subframe set indexes after the sorting, or selecting and feeding back last h2 subframe set indexes after the sorting, or feeding back the interference level corresponding to each of all the subframe sets in the time window; or sorting all the subframe sets according to the subframe set indexes, and firstly feeding back the interference level experienced by each of first h3 subframe sets after the sorting and then feeding back the interference level experienced by each of h3 subframe sets arranged after the subframe sets which are fed back the last time, if the last subframe set is reached, accumulating h3 subframe sets from the first subframe set for feedback, or if the last subframe set is reached, stopping the feedback at this time, and accumulating the subframe sets from the first subframe set for feedback the next time.

Alternatively, the channel state information in a unit of subframe set fed back by the transmission node 2 further includes: frequency domain information, which includes at least one of the following: a component carrier index, a subband index, a CQI based on a component carrier, and a CQI based on a subband.

When the transmission node 2 feeds back the channel state information in a unit of subframe set, it also feeds back frequency domain channel state information, such as CQI information of the best subband, wideband CQI information, or wideband CQI information on the best component carrier, CQI information of the best subband on the best component carrier, wideband CQI information on the worst component carrier, and CQI information of the worst subband on the worst component carrier.

Alternatively, the method for transmitting configuration information specifically includes: the configuration information being physical layer signaling or the configuration information being high layer signaling.

The physical layer signaling may be carried on a physical downlink control channel, such as a PDCCH or an ePDCCH.

The configuration information may be carried on the physical layer signaling, for example, the configuration information is carried through a dedicated downlink control format for time domain interference feedback, or the configuration information is added to a dedicated downlink control format for carrying data scheduling information, such as a DCI Format 0, a DCI Format 1A, a DCI Format 2B/2C, or a new downlink control format etc.

The configuration information may be carried on the high layer signaling, such as user-specific RRC signaling, or MAC layer signaling.

The configuration information may be partially carried on physical signaling, or may be partially carried on high layer signaling. For example, the high layer signaling configures one or more of subframe set related information, feedback manner information, and measured resource position information, and the physical layer signaling configures trigger information and/or measured transmission node information, or the high layer signaling configures one or more of feedback manner information and measured resource position information, and the physical layer signaling configures one or more of trigger information, measured transmission node information, and subframe set related information, or multiple groups of measured sets are configured through the high layer signaling, and a measured set which currently triggered for feedback is selected through the physical layer signaling.

The transmission node 2 receives high layer signaling and/or physical layer signaling according to the method for transmitting configuration information, and performs information feedback according to the received signaling.

Alternatively, the interference strength information specifically includes interference strength information alone, or interference strength information identified by CQI.

The individual interference strength information includes interference power measured for a specific resource.

The interference strength information identified by the CQI includes interference strength information identified by the CQI using target signal power and interference power information. The CQI may be wideband CQI, or may also be CQI based on preferably h4 subbands, herein h4 is a positive integer.

Alternatively, the channel state information includes channel state information before acquiring the configuration information (which may include a subframe in which the configuration information is located, or may not include the subframe in which the configuration information is located) and/or channel state information within a specific time after acquiring the configuration information.

The channel state information includes interference information which specifically includes interference information which has been experienced before acquiring the configuration information and/or information of interference which is experienced within a specific time after acquiring the configuration information.

The interference information may be defined in a predefined manner, for example, the interference information is defined as information of interference which has been experienced before acquiring the configuration information and/or information of interference which is experienced within a specific time after acquiring the configuration information.

It is also possible to use a manner of notification through signaling, for example, the interference information is determined according to time window related information in the subframe set related information. A position where the interference information is measured is determined from a position of the time window, and thereby the acquired interference information is fed back to a target transmission node.

The position of the time window may also be predefined, such as corresponding subframe sets in successive M subframes starting from the $k^{th}$ subframe after receiving the configuration information, herein M preferably is 8, 40, 80, etc., which depends on the definition of the subframe sets; and alternatively, the feedback manner information specifically includes at least one of the following: a feedback report type (for example, feedback for all the subframe sets, feedback for h1 subframe sets with minimum interference strength, feedback for h2 subframe sets with maximum interference strength, or round-robin feedback), a feedback mode (for example, information of interference experienced before acquiring the configuration information or information of interference experienced within a specific time after acquiring the configuration information), transmission timing-related information of the feedback information, and a transmission manner of the feedback information.

The transmission timing related information of the feedback information specifically includes: the number of triggers for feedback and/or time domain position related information for feedback. For example, when a dynamic trigger manner is used for feedback, the feedback may be triggered once at a time, or the feedback may be triggered many times at a time. A time interval for each feedback may be predefined or may also be configured through signaling.

The manner for transmitting the feedback information specifically includes: a channel type for transmission of the feedback information and/or channel position information for the transmission of the feedback information. For example, the feedback may be performed using a physical uplink control channel, or may also be performed using a physical uplink shared channel. When the feedback is performed using a physical uplink control channel, information related to an index of the physical uplink control channel is indicated, and when the feedback is performed using a physical uplink shared channel, related information such as a frequency domain position, modulation and coding, power indication signaling etc. of the physical uplink shared channel is indicated. Alternatively, the measured resource position information includes a resource position of a control channel area and/or a resource position of a data channel area. The manner for transmitting the feedback information may also include carrying the feedback information through high layer signaling, for example, a channel state of time domain subframe sets is fed back through RSSI or RSRQ.

The resource position may be configured using an existing CSI (CSI-RS, zero-power CSI-RS, or CSI-IM) resource position of an LTE system, or a CRS resource position. For example, interference is measured in positions of the virtual ports 1, 2 and 3 by muting data in the positions of virtual ports 1, 2 and 3, or the interference is directly measured according to the CRS, or interference is measured in a position of the virtual port 7 by muting the data in the position of the virtual port 7, or the interference is directly measured according to the DRS.

Alternatively, in addition to transmitting the configuration information, further, the transmission node 1 transmits data to the transmission node 2 in the same subframe set over a period of time, or the transmission node 1 receives data transmitted by the transmission node 2 in the same subframe set over a period of time.

Specifically, the transmission node 1 knows which subframe sets have less interference with the transmission node 2 and/or which subframe sets have heavy interference with the transmission node 2 according to the information fed back by the transmission node 2, and transmits data to the transmission node 2 on a subframe set with less interference, thereby avoiding the interference from neighboring cells with the transmission node 2.

In addition, the transmission node 1 transmits data to the transmission node 2 in the same subframe set over a period of time, which can also make the subframe set in which the transmission node 2 interferes with the neighboring cells invariable and avoid the interferences from the transmission node 2 with the neighboring cells from being in different subframe sets which is disadvantageous to interference coordination.

A part of the above configuration information and/or feedback information may also be in a predefined manner, and a part of the above information may be in a form of signaling.

In the following, the present document will be described in detail using the embodiments for different application scenarios.

Embodiment one: the transmission node 1 is a base station, and the transmission node is user equipment 1.

In an LTE system, the base station transmits configuration information to the user equipment 1 and receives interference information in a unit of subframe set fed back by the user equipment 1 according to the configuration information.

Herein, the configuration information includes trigger information for feedback of the interference information and measured resource position information.

The method for transmitting the configuration information specifically includes transmitting the configuration information through physical layer signaling and high layer signaling.

The physical layer signaling may be carried on a physical downlink control channel, such as a PDCCH or an ePDCCH.

The trigger information for the interference information is added to a dedicated downlink control format for carrying data scheduling information, such as DCI Format 0, and the feedback information is fed back through a physical uplink shared channel.

The high layer signaling configures the measured resource position information; and the resource position may be configured using an existing CSI-IM resource position of the LTE system.

The position of the time window is predefined, information of interference which has been experienced for each subframe set before acquiring the configuration information.

The feedback report type includes feedback for all the subframe sets.

The definition of the subframe sets specifically includes: predefining subframe sets, and dividing as multiple subframe sets according to HARQ processes in the time window, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios.

The interference information in a unit of subframe set fed back by the user equipment 1 specifically includes subframe set index and interference strength.

The interference strength information specifically includes interference strength information identified by wideband CQIs, or interference strength information identified by preferably h4 subband CQIs, or detected interference power.

The base station schedules the user equipment 1 on the subframe sets with less interference according to the received feedback information.

Before the time domain feedback information of the user equipment 1 is not received by the base station, data is transmitted to the user equipment 1 in the same subframe set, which may be selected according to other information fed back by the user equipment 1, or may be selected according to uplink channel measurement information.

Embodiment two: the transmission node 1 is a base station, and the transmission node 2 is user equipment 1.

In an LTE system, the user equipment 1 acquires configuration information transmitted by the base station; the user equipment 1 performs interference measurement according to the configuration information to acquire interference information in a time window; and the user equipment 1 feeds back the interference information in a unit of subframe set.

Herein, the configuration information includes trigger information for feedback of the interference information and measured resource position information.

The method for transmitting the configuration information specifically includes transmitting the configuration information through physical layer signaling and high layer signaling; and the physical layer signaling may be carried on a physical downlink control channel, such as a PDCCH or an ePDCCH.

The trigger information for the interference information is added to a dedicated downlink control format for carrying data scheduling information, such as DCI Format 0, and the feedback information is fed back through a physical uplink shared channel.

The high layer signaling configures the measured resource position information; and the resource position may be configured using an existing CSI-IM resource position of the LTE system.

The position of the time window is predefined, information of interference which has been experienced for each subframe set before acquiring the configuration information.

The feedback report type includes feedback for all the subframe sets; and the definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios.

The user equipment 1 receives high layer configuration information transmitted by the base station, and performs interference measurement on resources indicated by the configuration information.

The user equipment 1 detects DCI Format 0, and reports the interference information on a PUSCH indicated by the DCI Format 0 according to the trigger information in the DCI Format 0.

The interference information specifically includes interference strength; and the interference strength information specifically includes interference strength information identified by wideband CQIs, or interference strength information identified by preferably h4 subband CQIs, or detected interference power.

Embodiment three: the transmission node 1 is a base station, and the transmission node 2 is user equipment 2.

In an LTE system, the base station transmits configuration information to the user equipment 2, and receives interference information in a unit of subframe set fed back by the user equipment 2 according to the configuration information.

Herein, the configuration information includes a feedback period and an offset of the interference information, measured resource position information, and feedback manner information.

The method for transmitting the configuration information specifically includes transmitting the configuration information through high layer signaling.

The resource position may be configured using an existing CSI-IM resource position of the LTE system.

The position of the time window is predefined, information of interference which has been experienced for each subframe set before acquiring the configuration information.

The feedback report type includes feedback for h1 subframe sets with minimum interference (feedback for h2 subframe sets with maximum interference), and round-robin feedback; and the specific feedback report type is specifically configured through high layer signaling.

The definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios. Alternatively, the HARQ processes are grouped, and subframes corresponding to the same group of HARQ processes are included in a subframe set, and different groups of HARQ processes correspond to different subframe sets. For example, 8 processes are divided into 4 groups, herein process 0 and process 1 are group 0, process 2 and process 3 are group 1, process 4 and process 5 are group 2, and process 6 and process 7 are group 3.

The interference information specifically includes subframe set index and/or interference strength; and when h1 subframe sets with minimum interference (h2 for maximum interference) are fed back, the subframe set indexes are fed back, or the subframe set indexes and corresponding interference strength are fed back, and when feedback is performed in a round-robin manner, the interference strength is fed back.

The interference strength information specifically includes interference strength information identified by wideband CQIs, or interference strength information identified by preferably h4 subband CQIs, or detected interference power.

The base station schedules the user equipment 2 on the subframe set with less interference according to the received feedback information.

Embodiment four: the transmission node 1 is a base station, and the transmission node 2 is user equipment 2.

In an LTE system, the user equipment 2 acquires configuration information transmitted by the base station; the user equipment 2 performs interference measurement according to the configuration information to acquire interference information in a time window; and the user equipment 2 feeds back the interference information in a unit of subframe set.

Herein, the configuration information includes a feedback period and an offset of the interference information, measured resource position information, and feedback manner information.

The method for transmitting the configuration information specifically includes transmitting the configuration information through high layer signaling.

The resource position may be configured using an existing CSI-IM resource position of the LTE system or using a predefined CRS resource position.

The position of the time window is predefined, information of interference which has been experienced for each subframe set before acquiring the configuration information.

The feedback report type includes feedback for h1 subframe sets with minimum interference (h2 for maximum interference), and round-robin feedback; and the specific feedback report type is specifically configured through high layer signaling.

The definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios. Alternatively, the HARQ processes are grouped, and subframes corresponding to the same group of HARQ processes are included in a subframe set, and different groups of HARQ processes correspond to different subframe sets. For example, 8 processes are divided into 4 groups, herein process 0 and process 1 are group 0, process 2 and process 3 are group 1, process 4 and process 5 are group 2, and process 6 and process 7 are group 3.

The interference information specifically includes subframe set index and/or interference strength; and when h1 subframe sets with minimum interference (h2 for maximum interference) are fed back, the subframe set indexes are fed back, or the subframe set indexes and corresponding interference strength are fed back, and when feedback is performed in a round-robin manner, the interference strength is fed back.

The interference strength information specifically includes interference strength information identified by wideband CQIs, or interference strength information identified by preferably h4 subband CQIs, or detected interference power.

The user equipment 2 receives the high layer configuration information transmitted by the base station, performs interference measurement on a resource indicated by the configuration information, and performs feedback according to the period and offset as well as the report type configured by the high layer signaling.

Embodiment five: the transmission node 1 is a base station, and the transmission node 2 is user equipment 3.

In an LTE system, the base station transmits configuration information to the user equipment 3, and receives interference information in a unit of subframe set fed back by the user equipment 3 according to the configuration information.

Herein, the configuration information includes trigger information and feedback manner information.

The method for transmitting the configuration information specifically includes carrying the configuration information through a dedicated downlink control format for time domain interference feedback.

The resource position uses a predefined CRS resource position.

The position of the time window is predefined, information of interference which has been experienced for each subframe set before acquiring the configuration information.

The feedback report type is predefined as feedback for all the subframe sets.

The feedback information is carried through the PUSCH, and related information of the PUSCH such as frequency domain position information, a coding modulation scheme etc., is carried through a dedicated downlink control format for time domain interference feedback.

The definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios. Alternatively, by taking T subframes as a time window, each subframe corresponds to a subframe set, herein T is preferably 10, 20, 40 or 80.

The interference information specifically includes interference strength.

The interference strength information specifically includes interference strength information identified by wideband CQIs, or interference strength information identified by preferably h4 subband CQIs, or detected interference power.

The base station schedules the user equipment 3 on the subframe set with minimum less interference according to the received feedback information.

Embodiment six: the transmission node 1 is a base station, and the transmission node 2 is user equipment 3.

In an LTE system, the user equipment 3 acquires configuration information transmitted by the base station; the user equipment 3 performs interference measurement according to the configuration information to acquire interference information in a time window; and the user equipment 3 feeds back the interference information in a unit of subframe set.

Herein, the configuration information includes measured resource position information and feedback manner information.

The method for transmitting the configuration information specifically includes carrying the configuration information through a dedicated downlink control format for time domain interference feedback.

The resource position uses a predefined CRS resource position.

The position of the time window is predefined, information of interference which has been experienced for each subframe set before acquiring the configuration information.

The feedback report type is predefined as feedback for all the subframe sets.

The feedback information is carried through the PUSCH, and related information of the PUSCH such as frequency domain position information, a coding modulation scheme etc., is carried through a dedicated downlink control format for time domain interference feedback.

The definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios. Alternatively, by taking T subframes as a time window, each subframe corresponds to a subframe set, herein T is preferably 10, 20, 40 or 80.

The interference information specifically includes interference strength. The interference strength information specifically includes interference strength information identified by wideband CQIs, or interference strength information identified by preferably h4 subband CQIs, or detected interference power.

The user equipment 3 detects the dedicated downlink control format for time domain interference feedback transmitted by the base station, and performs interference feedback according to the configuration information carried by the downlink control format and the scheduling information of the PUSCH.

Embodiment seven: the transmission node 1 is a base station, and the transmission node 2 is user equipment 4.

In an LTE system, the base station transmits configuration information to the user equipment 4, and receives interference information in a unit of subframe set fed back by the user equipment 4 according to the configuration information.

Herein, the configuration information includes trigger information for feedback of the interference information.

The method for transmitting the configuration information specifically includes transmitting the configuration information through physical layer signaling.

The physical layer signaling may be carried on a physical downlink control channel, such as a PDCCH or an ePDCCH.

The trigger information for the interference information is added to a dedicated downlink control format for carrying data scheduling information, such as DCI Format 0, and the feedback information is fed back through a physical uplink shared channel.

The position of the time window is predefined, information of interference which has been experienced for each subframe set before acquiring the configuration information.

The feedback report type includes feedback for all the subframe sets.

The definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios.

The interference information in a unit of subframe set fed back by the user equipment 4 specifically includes interference strength and interference type information.

The interference strength information specifically includes interference strength information identified by wideband CQIs, or interference strength information identified by preferably h4 subband CQIs, or detected interference power, or wideband CQI information on preferably h5 component carriers, or CQI information of preferably h4 subbands on preferably h5 component carriers.

The interference type information includes intra-system interference or inter-system interference. For example, for an LTE system, the user equipment measures a dedicated signal of the LTE system, and if the measured power is greater than a predefined value, it is considered that the intra-system interference is detected; otherwise, interference power of the corresponding resource is measured, and if the measured value is greater than a threshold, it is considered that inter-system interference is detected; and if the intra-system interference and the inter-system interference are detected at the same time, the interferences can be reported at the same time, or only the maximum interference is reported, or the interferences are reported in a time division manner.

The base station schedules the user equipment 4 on the subframe set with low interference according to the received feedback information, or schedules the user equipment 4 on a component carrier with small interference of the subframe set with small interference, or reduces the intra-system interference in a parameter configuration manner, for example, in an orthogonal manner of sequences or ports, or in a pseudo-orthogonal manner, or in an interference randomization manner.

Embodiment eight: the transmission node 1 is a base station, and the transmission node 2 is user equipment 4.

In an LTE system, the user equipment 4 acquires configuration information transmitted by the base station; the user equipment 4 performs interference measurement according to the configuration information to acquire interference information in a time window; and the user equipment 4 feeds back the interference information in a unit of subframe set.

Herein, the configuration information includes trigger information for feedback of the interference information.

The method for transmitting the configuration information specifically includes transmitting the configuration information through physical layer signaling. The physical layer signaling may be carried on a physical downlink control channel, such as a PDCCH or an ePDCCH.

The trigger information for the interference information is added to a dedicated downlink control format for carrying data scheduling information, such as DCI Format 0, and the feedback information is fed back through a physical uplink shared channel.

The position of the time window is predefined, information of interference which has been experienced for each subframe set before acquiring the configuration information.

The feedback report type includes feedback for all the subframe sets.

The definition of the subframe sets specifically includes: predefining subframe sets, and dividing corresponding subframes according to HARQ processes, herein different HARQ processes correspond to different subframe sets. For the FDD-LTE, the subframes are divided into 8 subframe sets according to the HARQ processes, and each HARQ process corresponds to a subframe set, and for the TDD-LTE, the subframes are divided into subframe sets according to the HARQ processes corresponding to different uplink/downlink ratios.

The user equipment 4 detects the DCI Format 0, and reports the interference information on a PUSCH indicated by the DCI Format 0 according to the trigger information in the DCI Format 0.

The interference information in a unit of subframe set fed back by the user equipment 4 specifically includes interference strength and interference type information.

The interference strength information specifically includes interference strength information identified by wideband CQIs, or interference strength information identified by preferably h4 subband CQIs, or detected interference power, or wideband CQI information on preferably h5 component carriers, or CQI information of preferably h4 subbands on preferably h5 component carriers.

The interference type information includes intra-system interference or inter-system interference. For example, for an LTE system, the user equipment measures a dedicated signal of the LTE system, and if the measured power is greater than a predefined value, it is considered that the intra-system interference is detected; otherwise, interference power of the corresponding resource is measured, and if the measured value is greater than a threshold, it is considered that inter-system interference is detected; and if the intra-system interference and the inter-system interference are detected at the same time, the interferences can be reported at the same time, or only the maximum interference is reported, or the interferences are reported in a time division manner.

Embodiment nine: the transmission node 1 is a base station, and the transmission node 2 is user equipment 5.

In an LTE system, the base station transmits configuration information to the user equipment 5, and receives interference information in a unit of subframe set fed back by the user equipment 5 according to the configuration information.

Herein, the configuration information includes trigger information for feedback of the interference information and a feedback period of the channel state information.

The feedback period of the channel state information specifically includes a feedback interval, and the number of feedbacks.

The method for transmitting the configuration information specifically includes transmitting the configuration information through high layer signaling, and specifically, transmitting the configuration information through a physical downlink shared channel.

The feedback information is transmitted through high layer signaling, and specifically, through a physical uplink shared channel.

The position of the time window is predefined, information of interference which has been experienced for each subframe set within a specific time interval after acquiring the configuration information.

The feedback report type includes feedback for all the subframe sets.

The definition of the subframe sets specifically includes: configuring division of subframe sets through signaling. For example, the subframes are divided into 3 subframe sets, subframes corresponding to various subframe sets are indicated respectively through three signaling, or subframes corresponding to two specific subframe sets are indicated respectively through two signaling, and the remaining subframes are a third subframe set.

The interference information in a unit of subframe set fed back by the user equipment 5 specifically includes interference strength and interference type information.

The interference strength information specifically includes RSSI or RSRP or RSRQ.

The interference type information includes intra-system interference or inter-system interference. For example, for an LTE system, the user equipment measures a dedicated signal of the LTE system, and if the measured power is greater than a predefined value, it is considered that the intra-system interference is detected; otherwise, interference power of the corresponding resource is measured, and if the measured value is greater than a threshold, it is considered that inter-system interference is detected; and if the intra-system interference and the inter-system interference are detected at the same time, the interferences can be reported at the same time, or only the maximum interference is reported, or the interferences are reported in a time division manner.

The base station schedules the user equipment 5 on the subframe set with low interference according to the received feedback information, or schedules the user equipment 5 on a component carrier with small interference of the subframe set with small interference, or reduces the intra-system interference in a parameter configuration manner, for example, in an orthogonal manner of sequences or ports, or in a pseudo-orthogonal manner, or in an interference randomization manner.

Embodiment ten: the transmission node 1 is a base station, and the transmission node 2 is user equipment 5.

In an LTE system, the user equipment 5 acquires configuration information transmitted by the base station; the user equipment 5 performs interference measurement according to the configuration information to acquire interference information in a time window; and the user equipment 5 feeds back the interference information in a unit of subframe set.

Herein, the configuration information includes trigger information for feedback of the interference information and a feedback period of the channel state information.

The feedback period of the channel state information specifically includes a feedback interval, and the number of feedbacks.

The method for transmitting the configuration information specifically includes transmitting the configuration information through high layer signaling, and specifically, transmitting the configuration information through a physical downlink shared channel.

The feedback information is transmitted through high layer signaling, and specifically, through a physical uplink shared channel.

The position of the time window is predefined, information of interference which has been experienced for each subframe set within a specific time interval after acquiring the configuration information.

The feedback report type includes feedback for all the subframe sets.

The definition of the subframe sets specifically includes: configuring division of subframe sets through signaling. For example, the subframes are divided into 3 subframe sets, subframes corresponding to various subframe sets are indicated respectively through three signalings, or subframes corresponding to two particular subframe sets are indicated respectively through two signalings, and the remaining subframes are a third subframe set.

The user equipment 5 detects the configuration information, and performs interference measurement according to the configuration information to acquire interference information.

The interference information in a unit of subframe set fed back by the user equipment 5 specifically includes interference strength and interference type information.

The interference strength information specifically includes RSSI or RSRP or RSRQ.

The interference type information includes intra-system interference or inter-system interference. For example, for an LTE system, the user equipment measures a dedicated signal of the LTE system, and if the measured power is greater than a predefined value, it is considered that the intra-system interference is detected; otherwise, interference power of the corresponding resource is measured, and if the measured value is greater than a threshold, it is considered that inter-system interference is detected; and if the intra-system interference and the inter-system interference are detected at the same time, the interferences can be reported at the same time, or only the maximum interference is reported, or the interferences are reported in a time division manner.

With the above embodiments, it should be illustrated that by the user equipment feeding back interference information in the time window based on the subframe sets, the limitations on information interaction between base stations can be reduced, thereby improving the flexibility of practical network deployment and reducing the cost of applications.

When the transmission node 1 and the transmission node 2 correspond to communication through air interfaces between a base station and a base station respectively, the user equipment corresponds to a base station in the above embodiment, and the base station transmits data to another base station on a subframe set with low interference according to the received interference information to achieve the purpose of avoiding strong interference.

When the transmission node 1 and the transmission node 2 correspond to communication between a base station and a relay node respectively, the user equipment corresponds to a relay node in the above embodiment, and the base station schedules data transmission of the relay node according to the received feedback information of the relay node to achieve the purpose of avoiding strong interference.

When the transmission node 1 and the transmission node 2 correspond to communication between a user equipment and a user equipment respectively, the user equipment transmits data to another user equipment on a subframe set with low interference according to the received interference information to achieve the purpose of avoiding strong interference.

The above embodiments one, three, five, seven and nine are method embodiments of the transmission method according to the present document;

correspondingly, a basic constitutional structure of apparatus embodiments corresponding to the method embodiments, i.e., the above embodiments one, three, five, seven and nine includes a transmission unit arranged to transmit configuration information to a second transmission node; and a reception unit arranged to receive channel state information in a unit of subframe set fed back by the second transmission node according to the configuration information. The configuration information includes at least one of the following: trigger information for feedback of channel state information, a feedback period and an offset of the channel state information, subframe set related information, feedback manner information, measured resource position information, and measured transmission node information. Further, functional description corresponding to specific described content of various embodiments obtained from the apparatus embodiments on the basis of the basic constitutional structure, for example, the above embodiments one, three, five, seven and nine, will not be described anymore.

The above embodiments two, four, six, eight and ten are method embodiments of the feedback method according to the present document;

correspondingly, a basic constitutional structure of apparatus embodiments corresponding to the method embodiments, i.e., the above embodiments two, four, six, eight and ten includes a first acquisition unit arranged to acquire configuration information transmitted by a first transmission node; a second acquisition unit arranged to acquire channel state information in a time window according to the configuration information; and a feedback unit arranged to feed back the channel state information in a unit of subframe set. The configuration information includes at least one of the following: trigger information for feedback of the channel state information, a feedback period and an offset of the channel state information, subframe set related information, feedback manner information, measured resource position information, and measured transmission node information. Further, functional description corresponding to specific described content of various embodiments obtained from the apparatus embodiments on the basis of the basic constitutional structure, for example, the above embodiments two, four, six, eight and ten, will not be described anymore.

The integrated modules described in the embodiments of the present document can also be stored in a computer-readable storage medium if they are implemented in a form of software function modules and are sold or used as stand-alone products. Based on the understanding, the essence of the technical solutions according to the embodiments of the present document or a part thereof which contributes to the existing technology can be embodied in a form of software products. The computer software products are stored in a storage medium including a number of instructions for causing a computer device (which may be a personal computer, a server, or a network device etc.) to perform all or a part of the methods described in the various embodiments of the present document. The storage media described above includes various media which can store program codes, such as a USB disk, a removable hard disk, a Read-Only Memory (ROM), a Random Access Memory (RAM), a magnetic disk or an optical disk etc. Thus, an embodiment of the present document is not limited to any particular combination of hardware and software.

Correspondingly, an embodiment of the present document further provides a computer storage medium having a computer program stored therein, herein the computer program is used for executing the method for feeding back information and the method for transmitting information according to the embodiments of the present document.

The above description is merely preferred embodiments of the present document and is not intended to limit the protection scope of the present document.

INDUSTRIAL APPLICABILITY

The method for feeding back information according to an embodiment of the present document includes: a second transmission node acquiring configuration information transmitted by a first transmission node; the second transmission node acquiring channel state information in a time window according to the configuration information; and the second transmission node feeding back the channel state information in a unit of subframe set. With an embodiment of the present document, the channel state information in the time window is acquired according to the configuration information, and the channel state information is fed back in a unit of subframe set, which achieves feedback of the channel state information from the view of the time domain instead of feedback of the channel state information from the frequency domain. This at least solves the problem of efficiently performing interference coordination to mitigate interference and can avoid limitations on information interaction between base stations, thereby improving the flexibility of practical network deployment and reducing the cost of applications.

What is claimed is:

1. A method for feeding back information, comprising:

a second transmission node acquiring configuration information transmitted by a first transmission node;

the second transmission node acquiring channel state information in a time window according to the configuration information; and the second transmission node feeding back the channel state information in a subframe set; wherein, the time window comprises multiple subframe sets; wherein, the channel state information in a subframe set fed back by the second transmission node comprises: subframe set index;

wherein the subframe set index is selected to comprise at least one of the following:

feedback for h1 subframe sets with a best channel state in the time window;

feedback for h2 subframe sets with a worst channel state in the time window;

wherein h1 and h2 are positive integers.

2. The method according to claim 1, wherein the configuration information comprises at least one of the following: trigger information for feedback of the channel state information, a feedback period and an offset of the channel state information, subframe set related information, feedback manner information, measured resource position information, and measured transmission node information, and, wherein a transmission manner of the configuration information comprises that: the configuration information is transmitted by being carried on physical layer signaling or the configuration information is transmitted by being carried on high layer signaling.

3. The method according to claim 1, wherein the subframe set comprises a predefined subframe set or a subframe set configured by the first transmission node.

4. The method according to claim 1, wherein the channel state information in a subframe set fed back by the second transmission node further comprises at least one of the following: interference strength information, interference type information, interfered channel type information, Received Signal Strength Indication RSSI, and Reference Signal Receiving Quality RSRQ;

the interference type information comprises information of intra-system or inter-system; and the interfered channel type information comprises information of a control channel or a data channel, wherein the interference strength information comprises interference strength information alone, or interference strength information identified by a Channel Quality Indicator CQI.

5. The method according to claim 2, wherein the channel state information comprises channel state information before acquiring the configuration information or channel state information within a specified time after acquiring the configuration information, and, wherein the feedback manner information comprises at least one of the following: a feedback report type, a feedback mode, transmission timing-related information of the feedback information, and a transmission manner of the feedback information, and, wherein the measured resource position information comprises a resource position of a control channel area or a resource position of a data channel area, and, wherein the subframe set related information comprises at least one of the following: a number of subframe sets, a measured subframe set index, a subframe position corresponding to the measured subframe set, a size of the time window, and a position of the time window.

6. A method for transmitting information, comprising:

a first transmission node transmitting configuration information; and the first transmission node receiving the channel state information in a subframe set fed back by a second transmission node according to the configuration information, wherein, the channel state information is in a time window, wherein, the time window comprises multiple subframe sets;

wherein the channel state information in a subframe set fed back by the second transmission node comprises: subframe set index;

wherein the subframe set index is selected to comprise at least one of the following:

feedback for h1 subframe sets with a best channel state in the time window;

feedback for h2 subframe sets with a worst channel state in the time window;

wherein h1 and h2 are positive integers.

7. The method according to claim 6, wherein the configuration information comprises at least one of the following: trigger information for feedback of the channel state information, a feedback period and an offset of the channel state information, subframe set related information, feedback manner information, measured resource position information, and measured transmission node information, and, wherein a transmission manner of the configuration information comprises that: the configuration information is transmitted by being carried on physical layer signaling or the configuration information is transmitted by being carried on high layer signaling.

8. The method according to claim 6, wherein the subframe set comprises a predefined subframe set or a subframe set configured by the first transmission node.

9. The method according to claim 6, wherein the channel state information in a subframe set fed back by the second transmission node further comprises at least one of the following: interference strength information, interference type information, interfered channel type information, Received Signal Strength Indication RSSI, and Reference Signal Receiving Quality RSRQ;

the interference type information comprises information of intra-system or inter-system; and the interfered channel type information comprises information of a control channel or a data channel, wherein the interference strength information comprises interference strength information alone or interference strength information identified by a Channel Quality Indicator CQI.

10. The method according to claim 7, wherein the channel state information comprises channel state information before acquiring the configuration information or channel state information within a specified time after acquiring the configuration information, and, wherein the feedback manner information comprises at least one of the following: a feedback report type, a feedback mode, transmission timing-related information of the feedback information, and a transmission manner of the feedback information, and, wherein the measured resource position information comprises a resource position of a control channel area or a resource position of a data channel area, and, wherein the subframe set related information comprises at least one of the following: a number of subframe sets, a measured subframe set index, a subframe position corresponding to the measured subframe set, a size of the time window, and a position of the time window.

11. The method according to claim 6, wherein in addition to transmitting the configuration information, the first transmission node further:

transmits data to the second transmission node in a same subframe set over a period of time; or receives data transmitted by the second transmission node in a same subframe set over a period of time.

12. A non-transitory computer readable medium, storing instructions that when executed by a computer, cause the computer to implement following steps:

acquiring configuration information transmitted by a first transmission node;

acquiring channel state information in a time window according to the configuration information; and feeding back the channel state information in a subframe set; wherein, the time window comprises multiple subframe sets;

wherein the channel state information in a subframe set fed back by the second transmission node comprises: subframe set index;

wherein the subframe set index is selected to comprise at least one of the following:

feedback for h1 subframe sets with a best channel state in the time window;

feedback for h2 subframe sets with a worst channel state in the time window;

wherein h1 and h2 are positive integers.

13. The non-transitory computer readable medium according to claim 12, wherein the configuration information comprises at least one of the following: trigger information for feedback of the channel state information, a feedback period and an offset of the channel state information, subframe set related information, feedback manner information, measured resource position information, and measured transmission node information, and, wherein a transmission manner of the configuration information comprises that: the configuration information is transmitted by being carried on physical layer signaling or the configuration information is transmitted by being carried on high layer signaling.

14. The non-transitory computer readable medium according to claim 12, wherein the subframe set comprises a predefined subframe set or a subframe set configured by the first transmission node.

15. The non-transitory computer readable medium according to claim 12, wherein the channel state information in a subframe set fed back by the second transmission node further comprises at least one of the following: interference strength information, interference type information, interfered channel type information, Received Signal Strength Indication RSSI, and Reference Signal Receiving Quality RSRQ;

the interference type information comprises information of intra-system or inter-system; and the interfered channel type information comprises information of a control channel or a data channel, wherein the interference strength information comprises interference strength information alone, or interference strength information identified by a Channel Quality Indicator CQI.

16. The non-transitory computer readable medium according to claim 13, wherein the channel state information comprises channel state information before acquiring the configuration information or channel state information within a specified time after acquiring the configuration information, and, wherein the feedback manner information comprises at least one of the following: a feedback report type, a feedback mode, transmission timing-related information of the feedback information, and a transmission manner of the feedback information, and, wherein the measured resource position information comprises a resource position of a control channel area or a resource position of a data channel area, and, wherein the subframe set related information comprises at least one of the following: a number of subframe sets, a measured subframe set index, a subframe position corresponding to the measured subframe set, a size of the time window, and a position of the time window.

17. A non-transitory computer readable medium storing instructions that when executed by a computer, cause the computer to implement following steps:

transmitting configuration information to a second transmission node; and receiving the channel state information in a subframe set fed back by the second transmission node according to the configuration information; wherein, the channel state information is in a time window;

wherein, the time window comprises multiple subframe sets;

wherein the channel state information in a subframe set fed back by the second transmission node comprises: subframe set index; wherein the channel state information in a subframe set fed back by the second transmission node comprises: subframe set index;

wherein the subframe set index is selected to comprise at least one of the following:

feedback for h1 subframe sets with a best channel state in the time window;

feedback for h2 subframe sets with a worst channel state in the time window;

wherein h1 and h2 are positive integers.

18. The non-transitory computer readable medium according to claim 17, wherein the configuration information comprises at least one of the following: trigger information for feedback of a channel state, a feedback period and an offset of the channel state, subframe set related information, feedback manner information, measured resource position information, and measured transmission node information, and, wherein a transmission manner of the configuration information comprises that: the configuration information is transmitted by being carried on physical layer signaling or the configuration information is transmitted by being carried on high layer signaling.

19. The non-transitory computer readable medium according to claim 17, wherein the subframe set comprises a predefined subframe set or a subframe set configured by the first transmission node.

20. The non-transitory computer readable medium according to claim 17, wherein the channel state information in a subframe set fed back by the second transmission node further comprises at least one of the following: interference strength information, interference type information, interfered channel type information, Received Signal Strength Indication RSSI, and Reference Signal Receiving Quality RSRQ;

the interference type information comprises information of intra-system or inter-system; and the interfered channel type information comprises information of a control channel or a data channel, wherein the interference strength information comprises interference strength information alone or interference strength information identified by a Channel Quality Indicator CQI.

21. The non-transitory computer readable medium according to claim 18, wherein the channel state information comprises channel state information before acquiring the configuration information and/or channel state information within a specific time after acquiring the configuration information, and, wherein the feedback manner information comprises at least one of the following: a feedback report type, a feedback mode, transmission timing-related information of the feedback information, and a transmission manner of the feedback information, and, wherein the measured resource position information comprises a resource position of a control channel area or a resource position of a data channel area, and, wherein the subframe set related information comprises at least one of the following: a number of subframe sets, a measured subframe set index, a subframe position corresponding to the measured subframe set, a size of the time window, and a position of the time window.

22. The non-transitory computer readable medium according to claim 17, wherein further cause the computer to implement the following steps:

transmitting data to the second transmission node in a same subframe set over a period of time; and receiving data transmitted by the second transmission node in a same subframe set over a period of time.

* * * * *